United States Patent [19]

Jensen

[11] Patent Number: 4,609,284

[45] Date of Patent: Sep. 2, 1986

[54] DEVICE FOR EXPOSING SMALL ORIGINALS IN A REPRODUCTION CAMERA

[75] Inventor: Jakob N. Jensen, Hillerod, Denmark

[73] Assignee: Helioprint AS, Kvistgaard, Denmark

[21] Appl. No.: 703,741

[22] Filed: Feb. 21, 1985

[30] Foreign Application Priority Data

Feb. 24, 1984 [NL] Netherlands .................... 8400576

[51] Int. Cl.⁴ .................... G03B 27/74; G03B 27/80
[52] U.S. Cl. .................... 355/68; 355/70
[58] Field of Search .................... 355/67–70

[56] References Cited

U.S. PATENT DOCUMENTS

| | | | |
|---|---|---|---|
| 3,119,301 | 1/1964 | Beattie et al. | 355/70 X |
| 3,147,665 | 9/1964 | Anderson | 355/70 X |
| 3,402,636 | 9/1968 | Gemmer et al. | 355/70 X |
| 3,947,112 | 3/1976 | Hahn et al. | 355/70 X |
| 4,187,532 | 2/1980 | Naffier | 362/186 |

FOREIGN PATENT DOCUMENTS 2518394 4/1976 Fed. Rep. of Germany .
1542038 3/1979 United Kingdom .

Primary Examiner—Richard A. Wintercorn
Attorney, Agent, or Firm—Albert C. Johnston; James K. Hammond

[57] ABSTRACT

A dias light device to be placed on the original holder of a reproduction camera for effecting exposures with high enlargement of small originals comprises a housing provided with a window to receive a small original, such as a transparency, a light source in the housing, a light sensor for detecting light from a light source of a reproduction camera and a control system responsive to the sensor for activating the light source in the housing when the camera light source is active. The dias light device is applicable to any existing reproduction camera without any need to connect it with or alter the camera.

9 Claims, 3 Drawing Figures

DIVICE FOR EXPOSING SMALL ORIGINALS IN A REPRODUCTION CAMERA

This invention relates to a device for use with a reproduction camera in making a reproduction from a small original.

The standard reproduction camera comprises an original holder, a camera light source, a time-switch, a lens, and a platen for supporting a photographic material. To make a print from a transparent original on photographic material by use of a reproduction camera, the original holder is frequently provided with a light source by which the original to be reproduced can be back-lit. For this purpose, the original is placed on a ground glass platen and is illuminated from the other side of that platen by fluorescent or incandescent lamps. The exposure time can be set by means of the time switch in the reproduction camera.

If a large-format exposure is to be made from a small transparent original, such as for example a 35 mm transparency of about 24×36 mm in size, this cannot be done without difficulty by use of a standard reproduction camera. The guide mechanisms of the reproduction camera do not enable the distance between the original holder and the lens to be made as small as required to obtain the desired focus on the photographic material.

One solution of that shortcoming involves placing the small transparent original on an elevated holder called a dias light. German Offenlegungsschrift No. 25 18 394 discloses to such an elevated holder that is placed on the original holder of a reproduction camera and is provided with a transparent platen that can be exposed by means of a flash lamp disposed in the elevated holder. The transparent original can be imaged onto the photographic material with a high magnification by way of the lens of the reproduction camera. The exposure time is set by adjustment means situated on the elevated holder, and the exposure is controlled by a built-in control circuit comprising a time switch and a counter. The required amount of light is provided by flash pulses generated by the control circuit and counted in the counter.

That known exposing device, however, is disadvantageous in that an extra timing and control circuit is required in it, in addition to the timing and control circuit in the reproduction camera. The use of two substantially identical circuits in one apparatus is not a satisfactory solution of the problem. Also, automatic control of the main exposure and the additional exposures as used in many modern reproduction cameras is impossible with the known device. Although it would be possible to control the lamp of the device with the control means already present in the reproduction camera, the camera for this purpose would have to be provided with the correct means for connecting its exposure control system with the lamp of the elevated holder. This would make universal application of the dias light device impossible.

The object of this invention is to provide a device for exposing small originals that is suited for universal application to practically any existing reproduction camera without need to alter the reproduction camera. Also, in accordance with the present invention, an automatic exposure control present in the reproduction camera can carry out the entire exposure process in the normal manner even when a small original is to be reproduced by use of an elevated holder placed on the original holder of the camera.

The exposing device of the present invention is adapted to be disposed on the original holding means of a standard reproduction camera. This device comprises means for supporting a small original, such as a transparency, in an elevated position to be reproduced by the reproduction camera, a light means source for illuminating an original held on the supporting means, a sensing means for detecting illumination from the camera light means that serves for illuminating the original holder of the reproduction camera, and a means that responds to the sensing means when it detects such illumination for activating the light source of the exposing device.

In an advantageous embodiment of the invention, the exposing device comprises a relatively small and compact housing that is easily positionable by hand on the original holder of the reproduction camera. The housing contains the light source of the device, such as a suitable flashlamp, and has a top wall containing a window to receive an original for exposure; and the sensing means for detecting illumination from the camera light means is disposed in the housing.

In accordance with a further feature of the invention, the sensing means is a light sensitive element disposed in the bottom wall of the housing at a location for exposure to light from a camera light means located beneath the original holder of the reproduction camera.

Other objects, features and advantages of the invention will be apparent from the following description in which reference is made to the accompanying drawings. In the drawings.

Figure 1:
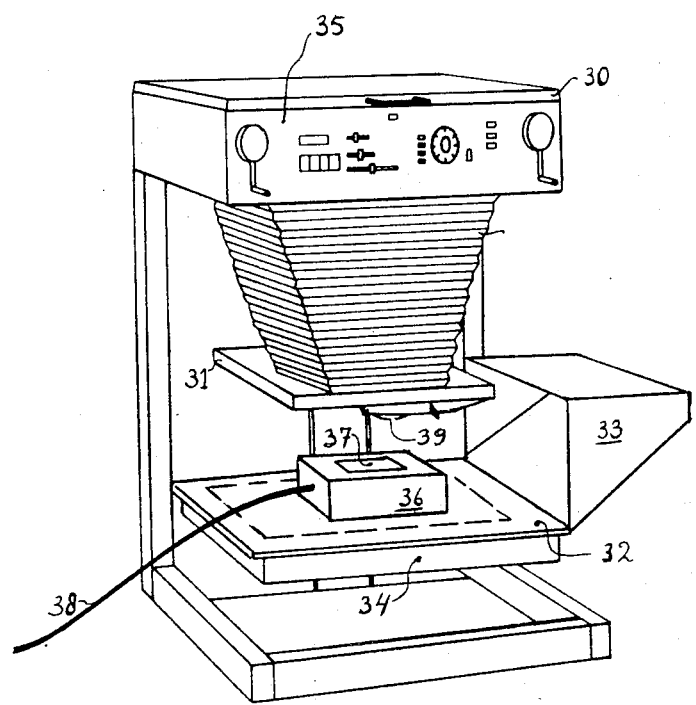
FIG. 1 is a perspective view of a reproduction camera provided with an exposing device for small originals according to a preferred embodiment of the present invention.

As illustrated in FIG. 1 of the drawings, a typical reproduction camera comprises a platen 30 for supporting photographic material such as photographic films and screens, a lens holder 31 and an original holder 32 for supporting a transparent original to be reproduced. An original placed on the original holder 32 is illuminated by a camera light source, which can be a lamp or lamps situated in container 33 and/or in the case of a transparent original, a lamp or lamps situated in a back-lighting container 34. A lens 39 disposed in the lens holder 31 images the original onto the photographic material supported by platen 30. The lens holder 31 and the original holder 32 are movable with respect to the platen 30 so that different magnification ratios can be set for the reproduction of an original placed on holder 32.

The camera has a control panel 35 in which control means are accessible for setting the holders 31 and 32 to the required positions relative to platen 30, and also for setting other process parameters such as film sensitivity, screen data, exposure time, and so on.

With conventional reproduction cameras, the magnification ratio can be varied between about 1:4 and 4:1. If a greater degree of enlargement than 1:4 is required, as often is the case, for example, when the original is a transparency film of 24×36 mm dimensions, auxiliary exposing device 36 according to this invention is placed on the original holder 32. The distance between the small transparent original and lens is thus reduced further so that a larger enlargement can be made.

The auxiliary exposing device 36 comprises a housing 40 (FIG. 3) which in its top wall has a transparent window 37 on which a transparent original can be placed to be reproduced by the reproduction camera. The back of the window 37 can be exposed by light from lamp means such as tubular lamps disposed inside the housing. A light sensing means is also provided, which comprises a light-sensitive element 43 disposed in the underside of the housing 40 at a location to detect illumination from the camera light source in the underside of the original holder 32.

The exposing device 36 is connected to a conventional power source, or mains, by a cord 38. When the light-sensitive element 43 is exposed to illumination from the camera light source, a control means 44 is activated to switch on the lamps such as lamp 42 of the device 36. While the lamps in the back-lighting container 34 are lighted, the lamps in the exposing device will also be lighted by means of the light-sensitive element 43 and the activated control means 44. When the exposure time set on the control panel 35 expires, the lamps in the back lighting container 34 go out and as a result the light-sensitive element 43 ceases to be illuminated and the lamps in the device 36 also go out.

The light from the original holder 32 of the camera may under some conditions of the camera operations cause a disturbance in the imagewise imaging of the transparent original placed on the auxiliary exposing device. To obviate such disturbance, the auxiliary device can be provided with means for inhibiting passage of light from the camera light means to an original placed on the window 41. For instance, the original holder 32 can be covered with a light-impermeable sheet or plate 47, such as a black sheet of paper or a sheet or plate fixed to the bottom of the housing 40, which is provided with an opening 48 at least at the location of the light-sensitive element 43 for passing the light from the lamps in the back-lighting container 34 to the light sensitive element.

Figure 2:
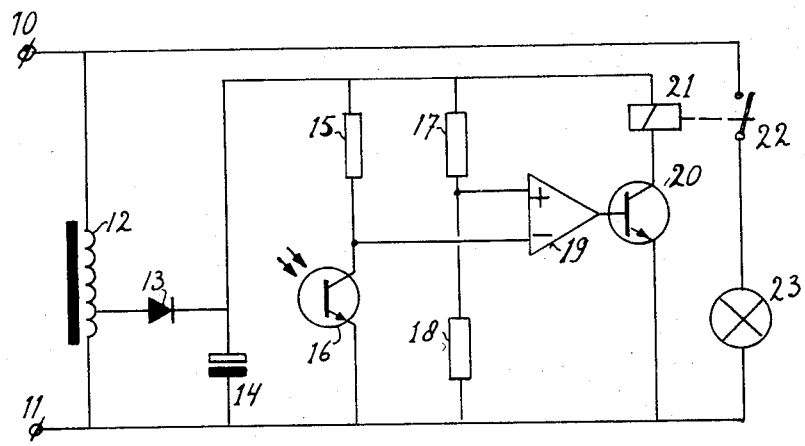
FIG. 2 is a schematic diagram of a light sensing and activating circuit suited for the exposing device.

FIG. 2 shows schematically a circuit suited for controlling the operation of the auxiliary exposing device. An autotransformer 12 is supplied with mains voltage via leads 10 and 11. A low d.c. voltage is tapped off the autotransformer 12 via diode 13 and is smoothed by means of capacitor 14. This d.c. voltage is applied through resistor 15 to the collector of a phototransistor 16, and is also connected to the negative input of IC comparator 19. The phototransistor 16 serves as the light-sensitive element 43 of the light device. Approximately half the d.c. voltage output of diode 13 is applied to the positive input of comparator 19 by means of a voltage divider formed by the resistors 17 and 18. When the voltage at the negative input of the comparator 19 is lower than the voltage at the positive input of comparator 19, the output of comparator 19 is high. When the voltage at the negative input is higher than the voltage at the positive input, the output of comparator 19 is low.

When the phototransistor 16 is not exposed to light, no current flows through phototransistor 16, and the voltage across the negative input of comparator 19 is higher than the voltage at the positive input of comparator 19. The output of comparator 19, which is connected to the base of transistor 20, then is low and transistor 20 is cut off. Consequently no current flows through relay 21 and the contact 22 of relay 21 stays open. When phototransistor 16 is exposed to light, current flows through phototransistor 16 and the voltage at the negative input of comparator 19 is lower than the voltage at the positive input of comparator 19. The output of comparator 19 then becomes high and causes transistor 20 to conduct current that flows through relay 21. Relay 21 is thus energized and closes contact 22, which now connects lamp 23 to the mains voltage so that lamp 23 is lighted. Relay 21 stays energized for as long as phototransistor 16 is exposed to light. The lamp 23 in FIG. 2 corresponds to the lamp or lamps 42 disposed in the housing 40 of the exposing device.

Figure 3:
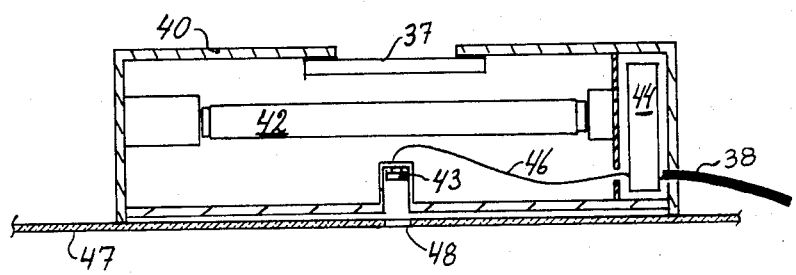
FIG. 3 is a cross-sectional view through the housing of the exposing device.

As may be seen in FIG. 3, which is a cross sectional view of an exposing device embodying the invention, a transparent window 41, preferably of opal glass, is disposed in a metal housing 40 and can be illuminated by means of a lamp 42 contained in the housing. A light-sensitive element 43 is disposed in an opening in the bottom of housing 40 for exposure to light from a camera light source located beneath the original holding means, such as holder 32 on which the auxiliary exposing device is to be placed for use. The light-sensitive element 43 is connected to the lamp activating control means 44 by a conducting cord 46, and that control means is connected to the mains or other conventional power source by a flexible conductor cord 38. There is no connection between the light sensing and activating means of the auxiliary exposing device and the reproduction camera.

The invention can be carried out in various other ways or embodiments, without restriction to particulars of the embodiment illustrated in the drawings and described above. For example, the light-sensitive element, shown as element 16 in FIG. 2 and as element 43 in FIG. 3, may equally well be a selenium cell or a cadmium sulphide cell. The position of the light-sensitive element can also be varied from that shown in FIG. 3. A bundle of optical glass fibers can be disposed in a path of illumination between one of the camera light sources, i.e., either a main lighting lamp or a back lighting lamp, and the light sensitive element. In reproduction cameras without back lighting, the element 43 can be positioned near the main lighting lamps and connected to the activating control means by a flexible conducting cord, so that the lamps in the auxiliary exposing device are activated when the light sensitive element is exposed to light from the main lighting lamps.

I claim:

1. A device for exposing originals of small size in a reproduction camera that comprises means for holding an original to be reproduced, camera light means for illuminating an original on said holding means, means for holding a photographic material, a lens and means for disposing the lens in focus between said original holding means and said material holding means;

said exposing device comprising:
   (a) means adapted to be placed on said original holding means for supporting an original of small size in an elevated position thereover so as to be reproducible by the reproduction camera;
   (b) a light source separate from said camera light means for illuminating an original positioned on said supporting means;
   (c) sensing means for detecting illumination from said camera light means; and
   (d) means responsive to said sensing means for activating said light source in response to said illumination.

2. An exposing according to claim 1, said supporting means comprising a housing positionable on said original holding means and containing said light source, said housing having a top wall containing a window to receive thereon a small original for exposure, and said sensing means being disposed in said housing.

3. An exposing device according to claim 2, said housing having a bottom wall to be seated on said original holding means, said sensing means being disposed in the underside of said housing at a location for exposure to light from a said camea light means located beneath said original holding means.

4. An exposing device according to claim 1, said supporting means comprising a housing positionable on said holding means and containing said light source, said sensing means comprising a light-sensitive element connected with said activating means by a flexible conductor.

5. An exposing device according to claim 1, further comprising a bundle of optical glass fibers disposed in a path of illumination from a said camera light means or conducting light to said sensing means.

6. An exposing device according to claim 1, 2, 3, 4, or 5, and means between said supporting means and said original holding means for inhibiting passage of light from a said camera light means located beneath said original holding means to an original in position of said device for exposure by said light source.

7. An exposing device according to claim 6, said means for inhibiting passage of light comprising a light-impermeable plate fixed to the bottom of said supporting means and adapted to cover said original holding means, said plate having an opening therein for passing light to said sensing means.

8. An exposing device for use in a reproduction camera that comprises means for holding an original to be reproduced and camera light means including a light source located beneath said original holding means for illuminating said holding means;

said exposing device being adapted to be disposed on said holding means and comprising:
(a) a housing positionable on said original holding means, said housing having a top wall containing a window for receiving an original to be reproduced by the reproduction camera and a bottom to be seated on said original holding means;
(b) lamp means inside said housing for illuminating an original on said window;
(c) a light-sensitive element for detecting illumination from said camera light means, said light-sensitive element being disposed in the underside of said housing at a location for exposure to light from said light source; and
(d) means responsive to said light-sensitive element for activating said lamp means when said light-sensitive element detects illumination from said light source.

9. An exposing device according to claim 8, and further comprising a light-impermeable plate fixed to the bottom of said housing said adapted to cover said original holding means for inhibiting passage of light from said light source to an original on said window, said plate having an opening therein for passing light to said light-sensitive element.

* * * * *